Nov. 18, 1941.  H. W. F. LORENZ  2,262,950
PROCESS FOR THE SEPARATION OF UNSAPONIFIABLE MATTER FROM
SAPONIFIABLE MATERIALS CONTAINING THE SAME
Filed June 29, 1937  2 Sheets-Sheet 1
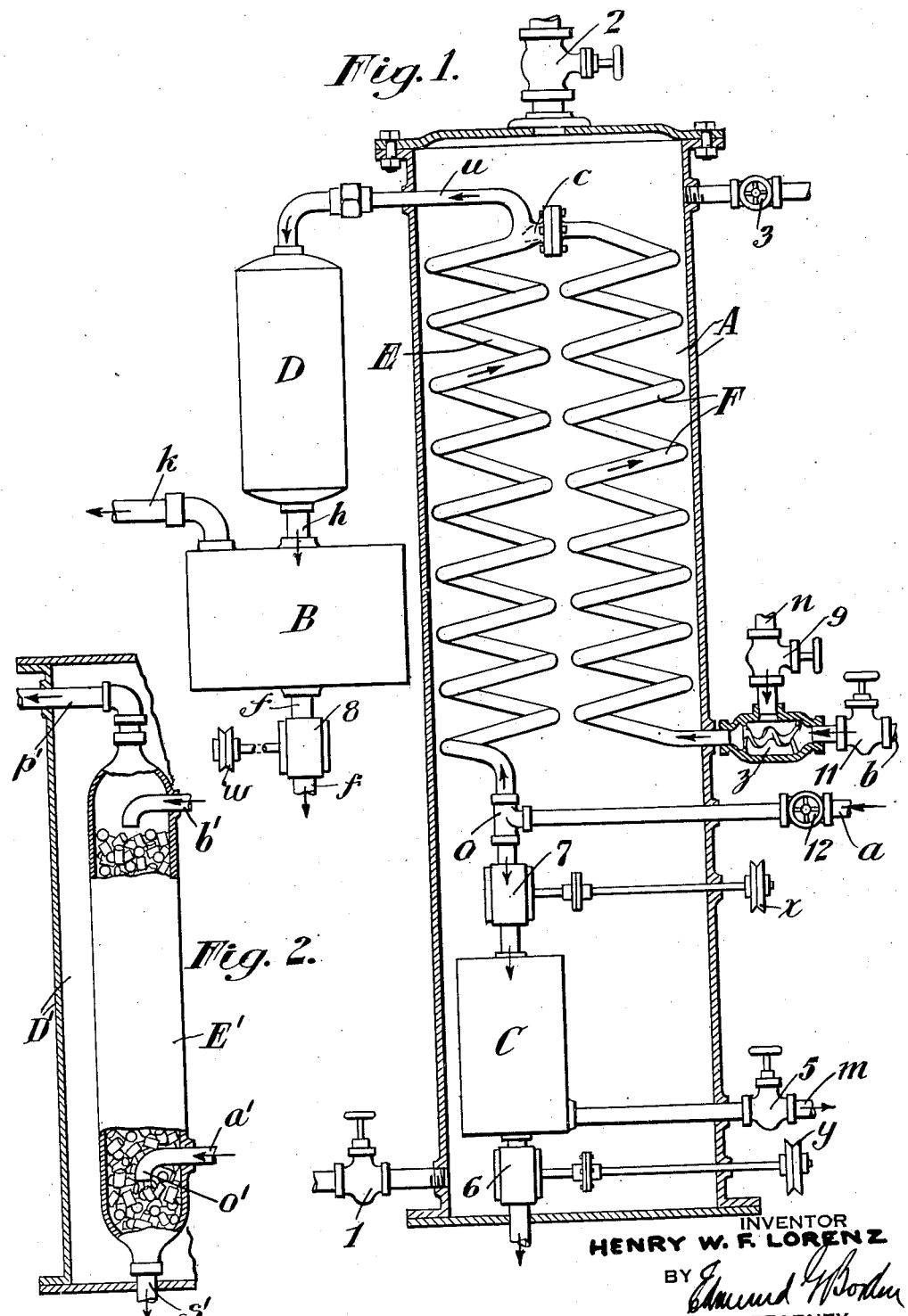
INVENTOR
HENRY W. F. LORENZ
BY
ATTORNEY Nov. 18, 1941. H. W. F. LORENZ 2,262,950
PROCESS FOR THE SEPARATION OF UNSAPONIFIABLE MATTER FROM
SAPONIFIABLE MATERIALS CONTAINING THE SAME
Filed June 29, 1937 2 Sheets-Sheet 2
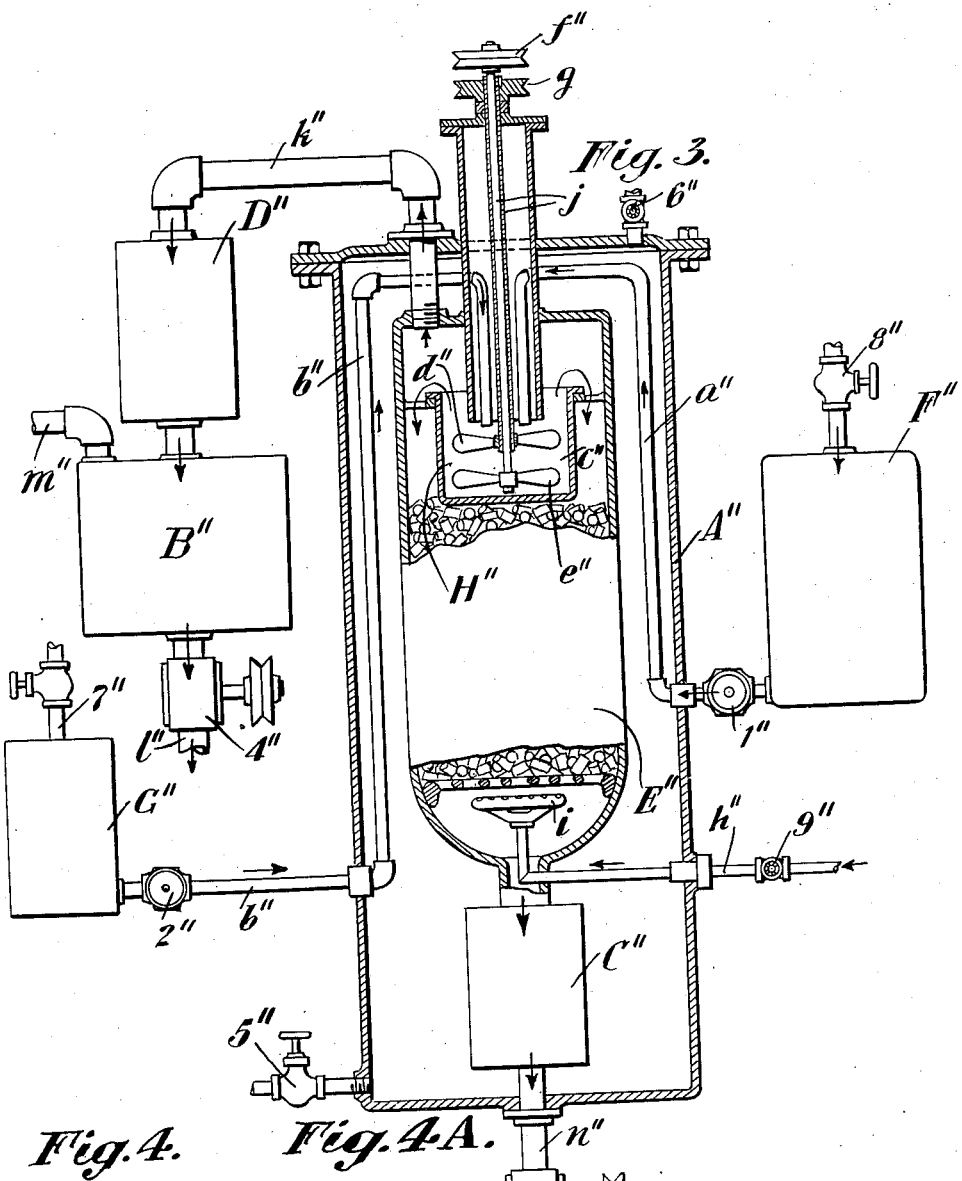
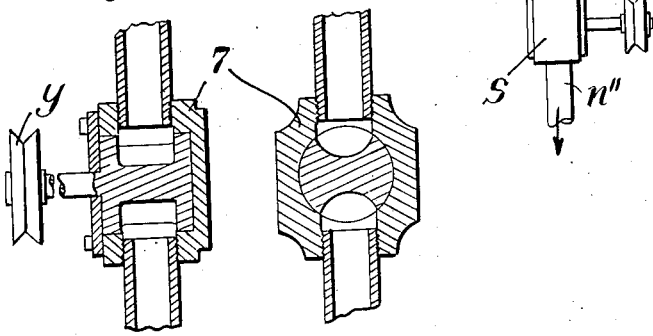
INVENTOR
HENRY W. F. LORENZ
BY
ATTORNEY Patented Nov. 18, 1941

2,262,950

UNITED STATES PATENT OFFICE 2,262,950

PROCESS FOR THE SEPARATION OF UNSAPONIFIABLE MATTER FROM SAPONIFIABLE MATERIALS CONTAINING THE SAME

Henry W. F. Lorenz, Jersey City, N. J.

Application June 29, 1937, Serial No. 151,036

18 Claims. (Cl. 260—418)

This invention relates to a continuous process and suitable apparatus for the separation of unsaponifiable matter from saponifiable materials containing the same.

This application is a continuation in part of my application Serial No. 101,907 filed September 22, 1936, which issued March 26, 1940 as Patent No. 2,194,708.

I have found that while my invention relates more specifically to the saponification of fats and/or oils, it can be made more general and to cover a broader field than said saponification of fats and oils and the recovery of the glycerine, etc., as will appear more fully hereinafter.

I have found that the manufacture of soap and recovery of the glycerine can be carried out more expeditiously and at a lesser cost when operated as a continuous process in a suitable apparatus, to be hereinafter more fully described. I have also found that this continuous process and apparatus has a general applicability—and need not necessarily be confined to the manufacture of soap—i. e. in similar or analogous operations with other saponifiable materials, as will appear in the further descriptions.

Broadly speaking, therefore, the object of my present invention involves a continuous process and apparatus for the separation of unsaponifiable matter contained in vegetable, animal, and marine animal oils and fats, waxes containing esters, halogenated hydrocarbons, fatty acids of whatever nature, or oxidation products of petroleum oils and waxes, of aliphatic and cycloaliphatic hydrocarbons, or like mixtures of carboxylic acids, naphthenic acids or esters, phenolic compounds, etc., from saponifiable materials, carried out by converting the saponifiable constituents within the raw materials into soaps, or their equivalents and mixtures, organic acid salts or their equivalents, including salt-like compounds of phenolic bodies, etc., and separating the unsaponifiable matter therefrom by continuous counter-current treatment, or extraction, of the resultant mixture of products with an inert, readily condensable gaseous or vaporous fluid at elevated temperature and, preferably, under reduced pressure, or a vacuum. (This vacuum may be a high vacuum), condensing the volatiles and separately collecting the volatile and non-volatile end products.

The steps of saponification, or neutralization, and the counter-current treatment for removing the unsaponifiable matter may be carried out consecutively or concurrently, without departing from the spirit of my invention.

In soap making by the commonly employed method, comparatively high-grade saponifiable oils and/or fats are mixed with an excess of caustic soda in aqueous solution and boiled with agitation by steam, or otherwise, in an open or covered kettle or vat until the saponification is more or less complete.

The mixture obtained consists of soap, water, glycerine, excess alkali, impurities and usually some unsaponified oil and/or fat.

The mixture is "salted out" by the addition to the contents of the soap kettle of common salt or strong aqueous salt solutions for the separation of soap and excess alkali and other impurities.

The soap mixture is now boiled and settled. Soap lye separates from the soap mass and contains most of the glycerine, salt, excess alkali and water. Successive "washings" are necessary for the removal of the greater part of the glycerine, some salt and alkali from the soap layer containing the same. The various lyes are filtered and the filtrate evaporated down, etc., for the recovery of the glycerine. The soap layer, in turn, is boiled with water and allowed to settle. Two layers are thus separated; these are called "settled soap" and "nigre." The latter contains most of the salt and excess alkali left in the soap and most of the other impurities. The nigre is reworked, etc. On a large scale only two to three batches can be worked to a finish per week.

It can be readily seen that such a soap process involves many steps, losses of desirable material (glycerine, etc.), time and labor. Only 85–87% at most of the total glycerine contained in the oils and/or fats are recovered, the remaining 13–15% and more represent glycerine still left in the soap, and glycerine losses incurred in the several steps of the process.

By my continuous process a great saving in time, labor and other expenses, and of valuable material (glycerine, etc.) is effected. Over 99% of the glycerine is recovered. Such losses, for instance of glycerine alone, during the past year by present processes amounted to some 27 million pounds of glycerine (80%), having a present value of 6 to 7 million dollars.

I obtain, also, a practically pure grade of glycerine, free from alkali, salt and other inorganic impurities. Also, as stated, all of the glycerine is nicely and smoothly separated from the soap. An excess of caustic alkali is avoided, in fact only the exact amount of alkali required for the saponification need be used by my process, a mild neutral soap being obtained in one continuous operation. Other advantages will appear below.

The soaps obtained by my process are odorless, or possess a mild, agreeable odor, even when malodorous raw materials are used. The color is more satisfactory than that obtained with the same materials worked by present commercial processes, or the soap may be practically colorless—white.

There is no loss of soap, the whole amount of soap theoretically obtainable results from my process.

The saponifying medium, e. g. caustic soda, may be employed as such in an anhydrous or powdered form, or in solution in a suitable solvent, e. g. water, alcohols and other organic solvents; or metal (alkali) alcoholates, alkali hydrocarbons (sodium naphthyl, etc.), or other similar organic alkali metal derivatives can be employed.

Soaps can also be made by my continuous process from fatty acids directly. Thus crude, malodorous fatty acids of whatever origin can be converted into odorless or practically odorless soaps, the volatile odoriferous principles being readily separated therefrom during the process. When the crude fatty acids and oxy-fatty acids used are those formed by the oxidation of petroleum products, mineral, shale, etc. oils, or waxes, the hydrocarbons still contained in the acid mixture are also eliminated from the resultant soaps together with other volatile impurities.

My continuous process can be carried out in a number of ways and with a variety of apparatus without departing from the spirit of my invention. For instance, the saponifiable oil and/or fat, previously heated to say 250-300° C., and the alkali solution, also previously and separately heated to say about the same temperature, are separately and continuously run into the top of an evacuated operating chamber maintained under reduced pressure and also heated to about the same temperature, in such proportions and ratios that all of the alkali will eventually be combined with the acidic radicals contained in said oil and/or fat.

On entering the operating chamber the alkali and saponifiable oil and/or fat pass into a mixing receptacle, in the said chamber, containing a stirring and mixing device operating under a high speed (or the two liquids may be intimately mixed by well-known spraying devices). A practically instantaneous saponification occurs and the mixture, overflowing the sides of this mixing receptacle and flowing downwardly over spreading means inside of said operating chamber, intimately contacts at the same time superheated steam entering the bottom of said operating chamber and passing upwardly in counter-current to the downwardly flowing saponified mixture.

The soap collects in a receptacle arranged at the bottom end of the operating chamber, whence it can be continuously withdrawn by special removal means from the system.

The volatile materials, including the glycerine and water vapor, are drawn off by means of a conduit at the top of the operating chamber by evacuating means, passing through a vertical condenser and collecting in a receptacle for the condensate, whence it also can be continuously withdrawn by special removal means. During the whole continuous operation a vacuum is maintained in the system.

I am aware that there are published descriptions covering methods for removing volatiles from oils, deodorizing fats and oils, with the use of inert gases, such as steam, etc. I am also aware that selective liquid solvents have been proposed for the same purpose. I consider, however, my invention distinctive and foreign to these processes.

The saponification of the esters, or neutralization of the acidic materials, containing unsaponifiable materials, may be accomplished in a prior stage and the saponified mixture then continuously counter-currently extracted with the aid of steam and a vacuum according to my invention, or, as stated, the saponification or neutralization step may occur simultaneously with the extraction step.

The amount of alkali required varies somewhat when oils and/or fats are used. It can be accurately determined by determining the saponification number of the material in hand and the amount of alkali required for a given quantity of oil and/or fat then suitably calculated.

The strength of the alkali solution can be varied within wide limits. Usually I may prefer a strong alkali solution. It may be of such a strength that at the operating temperature when passed into the reaction and extraction chamber it would show no great tendency to "boil" under the pressure conditions.

Instead of using caustic alkali, such as caustic soda, I may employ other basic or base-like media, depending upon the end product desired and the nature of the material to be treated. Such media may be carbonates of the alkali metals, carbonates, oxides, hydroxides of the earth alkali or of other metals, nitrogen bases such as ammonia, amines, etc., or mixtures of the same.

Ordinary anhydrous sodium soaps have relatively high melting points. The chemical literature teaches that mixtures of certain metallic soaps may have much lower melting points than the melting points of the individual soaps composing the mixture.

Thus a certain mixture of calcium, magnesium and potassium soaps may melt at a temperature of 150° C. Such a mixture is also mentioned in a recent U. S. Patent 2,056,984. I may also make use of much a mixture in my continuous process.

Saponifiable oils and fats, besides containing glycerides of various fatty acids, usually contain certain small percentages of unsaponifiable substances, including cholesterin, $C_{27}H_{44}O$, occurring in all animal fats from 0.2-1%, and phytostearin, $C_{26}H_{44}O$, present in all vegetable oils and fats, also wax-like lecithins, etc. Irradiated cholesterin and phytostearin have recently been identified with the class of vitamins. I can obtain cholesterin and phytostearin by my process in a practically pure state.

Odoriferous materials may also be present and/or formed during the saponification of oils and fats. These may be very objectional for soap making purposes, causing objectional odors in the finished soap, etc. The objectional impurities may be entirely removed from soaps made under the conditions of my invention.

My process also removes the highly disagreeable odors from such crude soap making materials as house grease, extraction and garbage grease, marine animal oils, etc., giving a resultant soap with a neutral or mild, agreeable odor. In the commonly used commercial method of making soap the oils and fats must be previously refined, or comparatively high grade oils and fats used, if a high grade soap is desired to be manufactured.

The preferable temperature to be used in my continuous process in ordinary soap making may vary from 250–300° C., although I do not limit myself to these temperatures. The temperatures may be considerably below 250° C., or above 300° C., depending upon the nature of the material being treated and the purpose thereof. The temperature may vary or be varied at different steps or stages of my continuous process also, and I need not confine myself to an exact definite temperature applied to the whole process.

As the process requires the material to possess sufficient liquidity at the temperatures employed in the counter-current treating step, where it is being treated with a readily condensable gaseous or vaporous fluid, the temperature of the material must naturally be sufficiently high for the purpose.

In some cases where there is not sufficient liquidity at the chosen operating temperature, or where a too high temperature would be required for rendering the material sufficiently liquid, a so-called "pour-point reducer" (which may be a hydrocarbon oil, higher alcohol, or ketone, etc.) may be present or added to the material to be saponified, to ensure a working at a lower temperature, and later again removed from the resultant products.

Again, the oil and/or fat may be, preliminarily, only partly saponified (by addition at first of only a part of the total saponifying medium required). The excess of oil or fat present in such a case acts as a "pour-point reducer" for the formed soap. The remainder of the saponifying medium required for completing the saponification is then added during the heating of the mixture to higher temperatures in a following stage or step of the process, thus maintaining sufficient liquidity for the counter-current treatment. In such a case two consecutive reaction chambers under different temperature conditions may be employed.

The glycerine and water vapors may be completely separated from one another by well known fractional condensations, or they may be condensed together. The condensations of the vapors may be carried out stepwise, therefore, to obtain glycerine of a high concentration in one and the same operation.

The inert gaseous or vaporous medium, or fluid, preferably, should be readily condensable, such as steam; it may be alcohols, ketones, benzene, toluene, ether, low-boiling hydrocarbons, etc. It may act, when condensed, as a solvent for all of the condensed volatiles, or a part thereof. Thus when superheated steam is used, the water formed by the condensation of the steam, will dissolve the glycerine but not the volatile oily materials, etc.

The reduced pressure, or vacuum, used may be anywhere below atmospheric pressure, i. e. from a slight vacuum to a high and practically absolute vacuum. Ordinarily I may prefer to use a high or relatively high vacuum, e. g. from 250 mm. mercury pressure to absolute.

In soap making, my process, hence, contemplates, for instance, the continuous heating and treating of the soap making materials and the saponifying medium in a continuously flowing stream containing the mixed reactants in proper proportions counter-currently with superheated steam under vacuum conditions, condensing the volatiles and separately collecting the condensed products and the soap.

Referring more particularly to the parts and describing my process and apparatus more fully, I may say that one method of carrying out my process may be as follows:

Fig. 1 is a diagrammatic view partly in section illustrating an apparatus in which the saponification, distillation and separation processes may be carried out.

Fig. 2 is a diagrammatic view of a modified form of a reaction chamber in which the counter-current saponification, distillation and separation steps may be carried out.

Fig. 3 is a diagrammatic view partly in section of another form of an apparatus in which the saponification, distillation and separation steps of the process may be carried out; and Figs. 4 and 4a are vertical sectional views of the valves used for removing products from the collecting chambers of the apparatus while maintaining a high vacuum therein.

Fig. 1 represents a vertical, closed treating vessel or chamber with inlet and outlet openings and valves 1, 2, 3. E and F are coils disposed inside said chamber A. C is a raffinate receiver. D on the outside of said chamber represents a condenser connected with coils E and F, E being connected with coil F at c. Baffles, or other means, may be contained in E and F, for ensuring turbulent counter-current flow and agitation.

B and C are receptacles for the condensate, or extract, and raffinate, or residue, respectively, B being connected with the condenser D at $h$, and C with coil E at $i$. Coil F has an outside opening at $j$, $b$, $n$. $a$ is a conduit for conducting the volatile vaporous medium (e. g. superheated steam) into coil E at $o$.

The receptacles B and C in turn have pipes or conduits $f$ and $g$ at the bottom (leading, for instance, to outside receptacles, not shown). B also has an opening $k$ at or near the top with connecting conduit leading to a vacuum producing means (not shown). Receptacle C also has a special connection $m$ leading to the outside, and usable if recycling is contemplated.

0, 1, 2, 3, 5, 11, 12 are valves; 6 and 8 and 7 are so-called "rotary or rotatable valves" (see Figs. 4 and 4a), which act on the principle of "rotary pumps," and are used for the purpose of transferring a liquid from a zone of, say, lower pressure to a zone of higher pressure, and are regulable as to speed of operation.

In describing the apparatus and the parts of the same more particularly, before describing the actual operation of the process itself, I may say, the closed chamber A is used for regulating and maintaining the temperature of its contents—coils E and F and receptacle C. This can be done in various well-known ways. A liquid, i. e. heated liquid or gaseous medium may be passed through A by means of valves 1 and 3 (valve 2 in this case being closed). Or, A may be heated externally, being partly filled with a volatile fluid boiling, say, at the operating temperature used, acting as a still with a return condenser (this latter can be attached at 2). The boiling point temperature of this fluid (oil, mercury, etc.) can be regulated by regulating the internal pressure in A. Thus, mercury, boiling at 357° C. under atmospheric pressure can be made to boil at 300° C. and below under a partial vacuum, 2 in this case being connected with a return condenser (not shown) topped with a pressure regulating valve. Thus the pressure inside A may be at atmospheric, sub-atmospheric, or superatmospheric pressure.

Receptable B is intended for receiving the volatile condensate and C the non-volatile residue.

Fig. 2 is a modified arrangement that may be substituted for part E of Fig. 1. In this case E' is the contacting and treating and extraction chamber. It may contain Raschig rings, baffles, glass, stoneware, or carbon or coke particles (which may be ¼ in. in size), Beryl saddles, or short rods, glass cylinders, or glass rings, or other suitable spreading and contacting means in the countercurrent treatment of the materials. The gaseous or vaporous fluid passes through conduit a into the chamber E' at o', flowing upwardly, while the material treated passes through the conduit b', c' into the chamber E', flowing downwardly in countercurrent to the gaseous or vaporous fluid (steam, etc.). The latter carrying with it the volatile extracted fraction of the material, or materials, under treatment, passes out of the chamber (E' at the upper end p' downwardly into a condenser, etc.) The raffinate, or non-volatile residue passes out of the chamber E' at s'.

A number of condensers, with respective receivers, operating at different and consecutively lower temperatures may be arranged in series, for obtaining a number of fractional condensations, etc. Single counter-current treaters, or extractors, with one or several condensers have been described above. A multiple or plural number of counter-current treaters may be used in series, consecutively, for the continuous treatment of the liquid material. My apparatus is, therefore, capable of various modifications and is not limited to the description given.

Figures 4 and 4a show the construction of valves for removing a liquid from the low pressure treating chamber to a container under ordinary, atmospheric pressure without appreciably affecting the degree of vacuum in the circuit. This "rotary valve" is operated at such speeds commensurate with the operation of the process, for the removal of the desired amount of accumulating liquid material; w, x are cross-sectional views of the same.

Operation of the process according to Fig. 1:

Have and hold chamber A at the operating temperature of the process. Close valves 9, 11, 12, 8, and 6. Start the evacuating means (not shown) and exhaust the air from the apparatus. A suitable gaseous or vaporous means (e. g. superheated steam) is now passed through conduit a, valve 12, into coil E at o, thence through the conduit u to the condenser D.

The raw saponifiable material, e. g. saponifiable oil and/or fat, preferably previously heated to the operating temperature, say 250–300° C., is now drawn (by the suction of the vacuum-producing means) under reduced pressure through conduit b, valve 11, into the coil F, while, simultaneously, the saponifying medium (e. g. caustic soda) is drawn (in proper quantity ratio to the saponifiable material) through circuit, i. e. conduit n, valve 9, is also drawn into coil F. Z may be an interposed stirring or mixing means for the two fluids.

The two, now mixed, fluids pass upwardly in coil F in turbulent flow and pass through the opening c, thence downwardly in the coil E in counter-current turbulent flow to the upwardly flowing gaseous or vaporous fluid (superheated steam, etc.).

The non-volatile matter (i. e. soap) passes in its downward flow through the "rotary valve" x—7 and conduit t into the chamber C, which may be under atmospheric pressure. The rotary valve x—7 is used for the purpose of transferring the liquid residue (i. e. soap) from the low pressure zone to the atmospheric pressure area without substantially affecting the state of the vacuum in the coil E. If desired, this residue may be retreated, or recycled, in contact with the vaporous means by pasing it through conduit m, valve 5, back to the extraction chamber E, or it may be removed through conduit g, valve 6—y to an exterior receiving means (not shown), etc., from which it may be sprayed into an enlarged chamber free from air, to produce a soap powder, or sprayed into water, under suitable conditions.

The gaseous or vaporous fluid (e. g. steam), passing upwardly through the treating and extraction coil E, carries with it the volatile extract from the saponified material and passing through the conduit u, is condensed in the condenser D, the condensed product (glycerine, etc.) passing into receptacle B. The liquid extract passes by means of the "rotary valve" w—8 to an outside receiving means.

We have thus saponified and separated the volatile matter from the residue (soap) in a continuous process with my apparatus.

It is self-evident that the mutual speeds of the various rotary valves are properly regulated in unison, to insure a proper working and automatic working of the apparatus and process.

A modification of my process and apparatus is shown in Fig. 3. A" is a vertical, closed treating chamber or zone that may be heated in any known suitable manner to the desired operating temperature. Thus, hot vapors or gases, hot oil or hot molten alloys, may be passed through A" by means of valves 5" and 6". Again, the chamber may represent a distilling vessel with return condenser, heated externally and containing a high-boiling liquid, such as an oil, mercury, etc. In this case a return condenser (not shown) is attached or connected with the top of the chamber at 6". The return condenser may have a regulable pressure valve attached to its upper end, so that the liquid can be made to boil at atmospheric pressure, or under pressure at a temperature higher than it would boil at atmospheric pressure, etc. Again, the liquid may be made to boil under reduced pressure (mercury, etc.).

Chamber A" contains a counter-current treating, inner chamber E". In the upper part of E" is arranged an open mixing vessel H" supplied with a mixing device, i. e. rotating shafts j and mixing blades attached thereto d", e".

F" is an outside vessel for supplying continuously definite quantities of saponifiable material by means of rotary valve 8", and conduit a" to the mixing chamber or vessel H".

G" is a similar vessel for supplying continuously definite and proper quantities of caustic alkali through rotary valve 2" and conduit b" to the same mixing vessel H".

d" and e" are propeller or mixing blades rotated by means of the hollow shaft j" containing an inner shaft; g" and h", are pulley wheels attached to the shafts. The shafts are preferably rotated contrariwise.

D" represents a condenser, B" a receiver. 4" is a rotary valve for removing accumulating condensate from B". m" is a conduit leading to vacuum producing means (not shown). h" is a conduit by means of which a gas or vapor (e. g. superheated steam) is introduced into chamber E". A spreader for the superheated steam i" may be attached to the egress end of the steam line $h''$. $9''$ is a valve for regulating the steam supply. $n''$ is a conduit leading outside from chamber $C''$, and is supplied with a rotary valve $3''$, for removing material from said chamber $C''$.

The rotary valves $1''$ and $2''$ function in unison and in such a manner and at such separate individual speeds as to supply continuously the requisite quantities of raw material (saponifiable matter) and reagent (e. g. caustic soda) to the mixing vessel $H''$.

Rotary valves $3''$ and $4''$ likewise function in such a way and at such speeds (and preferably in conjunction and unison with $1''$ and $2''$), as to continuously remove the residue or raffinate from $C''$ and the volatile matter, or extract, condensed in $B''$ in a continuous manner. Chamber $A''$ also contains a receiving vessel or chamber $C''$ and connecting conduits as shown, with valves, etc. $E''$ may also contain spreading and contacting filling material, etc.

The "rotary valves," so-called, act on the principle of rotary pumps, gear or screw pumps. Any suitable substitute means may be employed.

The various rotary valves and other valves may be made to operate, properly interconnected, in unison, automatically, at proper individual speeds.

Example, using the apparatus illustrated in Fig. 3. Making soap and recovering the glycerine and other volatiles present in or/and formed from the saponifiable matter, e. g. saponifiable oils and/or fats.

Apparatus $A''$ is brought to the proper working temperature, say 250–325° C., heating, in turn, its contents, chambers $E''$, $C''$, etc. The soap making raw material, e. g. saponifiable oil and/or fat is heated in container $F''$ to an elevated temperature, say 250–300° C., or somewhat higher. Likewise, the saponifying material (e. g. caustic soda) is heated in container $G''$ to an elevated temperature, which may also be 250–300° C.

Valves $1''$, $2''$, $3''$, $4''$, $9''$ are closed and the vacuum pump or means, i. e. other evacuating means, is now started and a vacuum produced in the system $E''$, $D''$, $B''$. A regulated quantity of superheated steam is now passed into chamber $E''$, through $h''$, valve $9''$. The reactants, contained in vessels $F''$ and $G''$ are now drawn, pumped or passed, respectively, through conduits $a''$ and $b''$ continuously and in balanced proportions (so as to produce in the end a neutral soap) by means of rotary valves $1''$ and $2''$ into the mixing chamber $H''$. At the same time the rotating mixing blades $d''$ and $e''$ are put in operation.

Instantaneous mixing and saponification takes place in chamber $H''$. A part of the volatiles (glycerine, moisture, etc.) evaporates and the remainder is removed from the soap formed as the latter, in a molten or liquid condition overflows the mixing chamber $H''$ and, flowing downwardly, encounters the superheated steam in counter-current flow, entering chamber $E''$ through valve $9''$, conduit $h''$, and spreader $i''$ and flowing upwardly.

Chamber $E''$ may be a packed tower, containing spreading or distributing means for the liquid soap descending downwardly from vessel $H''$. These spreading means may be baffle plates, or filling bodies, such as Raschig rings, glass, stoneware, or coke particles (preferable ¼ in. in size—coke), beryl saddles, or short rods, glass cylinders or rings, or any other means for securing proper distributing and contacting means.

The soap, now freed from glycerine and other volatiles, accumulates continuously in chamber $C''$, whence it may be continuously removed outside the chamber by means of conduit $n''$ and rotary valve $3''$, without affecting the vacuum existing in the operating circuit.

The vapors, containing the volatiles, pass continuously through conduit $k''$, are condensed by the condenser $D''$ and flow into the chamber $B''$, whence they may be continuously removed outside the circuit by means of conduit $l''$ and rotary valve $4''$, without affecting the vacuum in said circuit.

By using a series of condensers and receivers (not shown) the glycerine may be concentrated in one and the same operation by well known means.

It is also understood, that the "rotary valves" $1''$, $2''$, $3''$, $4''$, and other valves may be interconnected and made to operate at such individual variations in speeds as to make the entire process automatic and continuous.

It is also understood that the saponifiable material and the saponifying matter are preferably supplied to the vessel $H''$ in chamber $E''$ in a heated condition, and continuously. $G''$ and $F''$ may also represent heating zones containing coils through which the respective reactants flow continuously from outside sources, before entering through the rotary valves $1''$ and $2''$.

One of the various modifications of my apparatus may be described as follows. A spraying device, such as a spraying nozzle, may be attached to the exit end of coil F, Fig. 1, where it enters coil E at $c$. Saponified material passing through coil F is then forced through this sprayer and thus sprayed into coil E, through which a volatilized condensable fluid, e. g. superheated steam is passing upwardly in countercurrent, in other words, the saponified material is sprayed into a passing current of superheated steam.

In Fig. 2 likewise a spraying device may be attached at the point $o'$.

In Fig. 4 the inner vessel $H''$ and the stirring device $f$, $g$, $j$, $c''$, $d'$, $e''$ may be eliminated and the ends of the conduits $a''$ and $b''$ have a mutual mixing and spraying device, a kind of compound spraying nozzle, for spraying, e. g. an unsaponified mixture of oil and/or fat and a caustic alkali solution in commingling relationship into the top end of said reaction and extraction chamber $E''$, and consequently into a moving stream of superheated steam passing upwardly in counter-current to the downwardly flowing material through said chamber $E''$. An immediate saponification of the saponifiable material, e. g. oil and/or fat, is effected, with the removal of the volatiles, glycerine and other volatile unsaponifiable constituents; anhydrous soap and glycerine and other volatiles, including cholesterol and/or phytosterol, are recovered.

The unsaponified oil and/or fat and a caustic alkali solution may be sprayed in commingling relationship, or separate streams of saponifiable oil and/or fat and caustic alkali solution may be sprayed in commingling relationship. Again, saponifiable oil and/or fat and a caustic alkali solution may be sprayed in conjunction with steam in commingling relationship into a counter-current stream of superheated steam. Other basic media may be employed, depending upon the nature of the material treated, thus with fatty acids carbonates of the alkali metals, etc. may be used.

The operation may be effected in said apparatus under atmospheric, sub-atmospheric, or super-atmospheric conditions.

Such a modified apparatus may thus be one of a number of apparatus that may be employed for carrying out my invention as revealed in my Patent No. 2,096,188 issued October 19, 1937.

As above stated, glycerine, moisture and other unsaponifiable constituents are removed from the saponified material and anhydrous soap, and glycerine, recovered.

The oil and/or fat may previously be heated to a suitable elevated temperature and the caustic alkali solution may or may not be similarly preheated before entering the apparatus. The superheated steam is preferably heated to a temperature ranging from 250–325° C., or higher, the object being to have the resulting soap mixture possess sufficient liquidity, preferably in a thinly liquid condition.

It is obvious that my process, where saponifiable oils and/or fats are concerned, also involves the preparation of cholesterol and/or phytosterol. These materials are of present interest and value. Cholesterol when irradiated becomes vitamin D.

I claim:

1. A continuous process of producing soap directly from a saponifiable material by the reaction therewith of an aqueous solution of a saponifying agent, and recovering the volatile unsaponifiable matter present in and produced by the process, which comprises: Continuously passing preheated separate streams of a saponifiable material and a saponifying reagent to be heated, elongated and vertically placed contacting, reacting and stripping chamber, to produce a flowing stream of a mixture of molten soap and volatile unsaponifiable matter; permitting the said mixture to flow downwardly by gravity in thin streams having a free surface; concurrently and continuously passing into and causing to flow upwardly through said chamber, by suction means, in direct intimate contact with and in counter-current relationship to said liquid streams of reacting materials, a heated stream of an inert, readily condensable vaporous medium, to aid in the saponification and to strip the volatile unsaponifiable matter from the liquid mixture formed in said chamber; continuously and concurrently removing said vaporous stripping medium together with the vapors of the volatile unsaponifiable matters from said chamber at a rate sufficient to maintain a sufficient vacuum therein to vaporize substantially all the water and other volatile unsaponifiable matters in said mixture; and continuously and concurrently withdrawing the hot liquid and substantially anhydrous soap from said chamber in such a manner as not to impair the vacuum maintained therein.

2. A continuous process of producing soap directly from saponifiable matter by the reaction therewith of an aqueous solution of a saponifying reagent and recovering the volatile unsaponifiable matter present in and produced by the process, which comprises: Contacting the heated materials to produce a liquid mixture of soap and volatile unsaponifiable matter; continuously passing the liquid mixture of soap and volatile unsaponifiable matter in thin streams having a free surface into an evaporating and stripping chamber; simultaneously and continuously passing into and through said chamber in direct contact with and in counter-current relationship to said flowing liquid mixture of soap and volatile unsaponifiable matter a stream of superheated steam, in order to strip the volatile unsaponifiable matter from said soap mixture in said chamber, continuously removing the water vapor together with the vapors of the volatile unsaponifiable matter from said chamber at a rate sufficient to maintain a sufficient vacuum therein, to vaporize substantially all the water and volatile unsaponifiable matter in said mixture; and continuously withdrawing soap from said chamber in such a manner as not to impair the vacuum maintained therein.

3. A continuous process of producing substantially anhydrous soap containing cylinder oil, directly from saponifiable material containing the same, by the reaction therewith of a solution of a saponifying reagent, and recovering the glycerine produced by the process, which comprises: Contacting the heated materials and a base to produce a liquid mixture of soap, glycerine and cylinder oil; continuously passing the heated liquid mixture of soap, glycerine and cylinder oil as a liquid into a heated evaporating and stripping chamber; concurrently and continuously passing into and through said chamber in direct intimate contact with and in counter-current relationship to said liquid mixture of soap, glycerine and cylinder oil a stream of heated readily condensable vaporous medium, in order to strip the glycerine and water vapor from the soap mixture in said chamber; continuously permitting the vapors of glycerine, water and the readily condensable vaporous medium to escape from said chamber; continuously condensing and collecting the glycerine and other condensed vapors; and continuously withdrawing and collecting the soap-cylinder oil mixture from said chamber.

4. A continuous process of producing substantially anhydrous soap containing cylinder oil, directly from a saponifiable material containing the same by the reaction therewith of solution of a saponifying reagent, and recovery of the glycerine produced by the process, which comprises: Continuously passing the heated liquid mixture of said saponifiable material containing said cylinder oil and the saponifying reagent to a heated contacting, reacting and stripping chamber; simultaneously and continuously passing into and through said chamber in direct intimate contact therewith and in counter-current relationship to said reacting materials a stream of a heated inert vaporous readily condensable medium, to aid the saponification and to strip the glycerine and water vapor from the soap-cylinder oil mixture formed in said chamber; continuously removing the water and glycerine vapors and the vapors of the inert vaporous readily condensable medium from said chamber at a rate sufficient to maintain a suitable vacuum therein, to vaporize substantially all the water and glycerine in said mixture; and continuously withdrawing the soap-cylinder oil mixture in a liquid substantially anhydrous condition from said chamber in such a manner as not to impair the vacuum maintained therein.

5. The continuous process of making soap and recovering the volatile unsaponifiable matter present in and formed during the saponification of the saponifiable material, which consists in heating a flowing liquid mixture of saponifiable material containing unsaponifiable matter and a base to a temperature in excess of the melting point of the resulting anhydrous soap and continuously and thoroughly agitating the flowing liquid mixture in an atmosphere free from air in intimate contact with a counter-currently flowing stream of a heated inert vaporous stripping medium exclusive of water vapor.

6. The continuous process of making soap and recovering the volatile unsaponifiable matter present in and formed during the saponification of the saponifiable material, which consists in heating separately flowing streams of saponifiable material containing unsaponifiable matter, and a base, to a temperature in excess of the melting point of the resulting anhydrous soap, intimately contacting and combining said streams while concurrently and continuously subjecting the formed liquid mixture under sub-atmospheric pressure conditions to agitation and intimate contact with a counter-currently flowing stream of a heated inert vaporous readily condensable stripping medium other than water vapor, and collecting the formed soap and the volatile unsaponifiable matter.

7. The continuous separation of volatile unsaponifiable matter from saponifiable material containing the same, by saponification and distillation, the steps which comprise, continuously saponifying a flowing liquid stream of said saponifiable material in admixture with a base and at a temperature in excess of the melting point of the resultant anhydrous saponified product, and continuously and concurrently subjecting said liquid flowing stream undergoing saponification to a heated inert vaporous readily condensable extracting medium in counter-current, while maintaining both the saponification step and the concurrent continuous extraction step under vacuum conditions, and separately collecting and removing the volatile unsaponifiable matter and the non-volatile saponification product.

8. In the continuous separation of volatile unsaponifiable matter from saponifiable material containing the same, by saponification and steam distillation, the steps which comprise continuously saponifying a moving liquid stream of said saponifiable material in admixture with a base at a temperature in excess of the melting point of the resultant anhydrous soap and continuously and simultaneously subjecting said moving liquid stream to steam distillation counter-currentwise, and separately collecting the volatile unsaponifiable matter and the non-volatile soap.

9. In the continuous separation of volatile unsaponifiable matter from saponifiable material containing the same, by saponification and distillation, the steps which comprise preliminarily saponifying the saponifiable material with an alkaline medium sufficient to effect complete saponification at a temperature in excess of the melting point of the resulting anhydrous product, then subjecting the heated liquid saponified material in continuous flow to an inert vaporous stripping means other than water vapor flowing counter-current thereto while under continuous vacuum conditions, and collecting separately the condensed unsaponifiable matter and the non-volatile saponification product.

10. In a continuous separation of volatile unsaponifiable matter from saponifiable material containing the same by saponification and distillation, the steps which comprise continually saponifying at a temperature in excess of 200° C. a downwardly flowing stream of a mixture of saponifiable material and a saponifying agent and simultaneously and continuously subjecting said downwardly flowing heated liquid mixture in counter-current turbulent flow in intimate contact to an upwardly flowing heated inert vaporous extracting medium while maintaining both the saponification step and the simultaneous extraction step under vacuum conditions, and continuously condensing and collecting the volatile materials and the non-volatile saponification product.

11. In the continuous separation of glycerol, sterols and other volatile unsaponification matters from saponifiable oils or fats containing the same, by saponification and distillation, the steps which comprise continuously mixing a moving stream of said saponifiable oil or fat at elevated temperature with a moving stream of caustic alkali solution, sufficient to cause complete saponification, and simultaneously and concurrently subjecting said flowing stream of a mixture of saponifiable oil or fat and caustic alkali solution while undergoing saponification at a temperature in excess of 250° C. counter-currentwise and under sub-atmospheric pressure conditions to a continuously flowing stream of superheated steam, continuously condensing the resulting flowing stream of the vapors of glycerol, sterols and other volatiles and steam, and separately collecting continuously said condensate and the non-volatile soap.

12. The continuous process of making soap and glycerol and recovering the sterols which consists in heating a flowing mixture of a fat and a base to a temperature in excess of the melting point of the resulting anhydrous soap to cause saponification and continuously and concurrently passing said saponified mixture in an enclosed reaction chamber with thorough agitation in turbulent flow in an atmosphere free from air in intimate counter-current flow with a moving stream of water vapor.

13. The continuous process of making soap and glycerine and recovering the sterols which consists in heating a moving stream of a mixture of saponifiable oil or fat and a base to a temperature in excess of the melting point of the resulting anhydrous soap and passing said mixture with thorough agitation and turbulation in counter-current flow preferably under diminished pressure, with a stream of water vapor and continuously condensing the glycerine and sterols and water vapor and separately collecting the soap and said glycerine and sterols.

14. The continuous process of manufacturing soap containing substantially no glycerine and water which comprises heating a flowing stream of a soap and glycerine mixture uniformly to a temperature in excess of its melting point when anhydrous, excluding substantially all air from the molten mixture and continuously and concurrently passing said mixture with thorough agitation in intimate counter-current flow and preferably under diminished pressure with a moving current of steam and carrying the glycerine from the molten mixture by a current of steam.

15. A continuous process for the manufacture of soap and glycerol and recovery of the cholesterol, phytosterol and other volatile matter, consisting in the treatment of fats or fatty oils with an alkaline medium sufficient to effect saponification, the subjection of a flowing stream of the composition thus formed to heat, without local overheating, to a temperature in excess of 250° C., with the exclusion of air, in a closed vessel with the aid of diminished pressure, in counter-current flow with a current of steam, for the volatilization and recovery of the glycerine produced, and for the volatilization and removal of cholesterol and/or phytosterol, and other volatile matter.

16. The continuous process for the manufacture of soap and glycerine, consisting in the heating of continuously flowing streams of fats or saponifiable oils and saponifying medium individually and separately to a temperature in excess of 250° C., separately and continuously passing the heated fats or saponifiable oils and saponifying medium into a mixing vessel contained in the upper part of a reaction and stripping chamber, also heated to a temperature in excess of 250° C., continuously and concurrently permitting the now substantially saponified material mixture produced to flow downwardly in said reaction and stripping chamber, counter-currently treating the downwardly flowing saponified material with a continuously upwardly flowing current of superheated steam while maintaining sub-atmospheric pressure conditions in said reaction and stripping chamber, removing continuously the glycerine and other volatiles with said moving current of superheated steam, continuously condensing said volatiles and continuously collecting the extracted volatile materials, glycerine and the soap.

17. An apparatus for continuously chemically treating materials possessing liquidity at elevated temperatures and separating the final reaction products with the aid of an inert readily condensable vaporous fluid, such as steam, comprising, on the one hand, and primarily, heating, reacting and stripping means and, on the other hand, and secondarily, evacuating and condensing means, and more specifically comprising respectively, primarily, a vertically disposed closed vessel with means for maintaining and regulating the internal temperature thereof and including in combination and interconnectedly disposed therein a liquid material receiving and heating coil and an enclosed elongated vertically placed reaction and stripping zone, preferably containing intimately contacting means in connection with a residue receptacle and, secondarily, an outside vapor condensing means connected with a condensate receptacle in continuity with an evacuating means, means for continuously introducing in regulable proportions and quantities the preheated chemically reactive materials into said materials-receiving and heating coil and means for passing the liquid reaction mixture into the upper part of the reaction and stripping zone, means for continuously and concurrently introducing a heated inert readily condensable vaporous medium into the lower part of the same reaction and stripping zone, means for intimately contacting in counter-current turbulent flow the downwardly flowing heated liquid reaction mixture with the upwardly flowing heated inert readily condensable vaporous medium, means for continuously removing the stripped residue from the reaction and stripping zone to a residue receptacle, and means for removing continuously the condensate from the condensate receptacle in such a manner as not to impair the vacuum maintained in the system.

18. An apparatus for the continuous separation of volatile unsaponifiable matter from saponifiable materials containing the same, by saponification and distillation, the combination of parts which comprise a vertical jacketed reaction and counter-current reaction or stripping chamber connected at its bottom end with a receiving vessel and containing suspended near its top an open mixing vessel containing agitating means, means for evacuating said chamber by a conduit leading from said chamber to a condenser, receiver and evacuating means, means for introducing into the said mixing vessel inside said reaction chamber saponifiable material and a saponifying medium, means for introducing into said reaction chamber at or near its bottom end of a heated vaporous extracting means, e. g. superheated steam, and means for regulating the inflow and outflow continuously of fluids from said reaction and extraction chamber and its connected parts, and means for withdrawing the liquid non-volatile saponified material from the reaction and extraction chamber into a bottom receptacle in such a manner as not to impair the vacuum maintained therein.

HENRY W. F. LORENZ.